(12) United States Patent
Guo et al.

(10) Patent No.: US 11,891,768 B2
(45) Date of Patent: Feb. 6, 2024

(54) AUXILIARY STRUCTURE FOR FLOATING AND SINKING A WHOLE OFFSHORE WIND TURBINE WITH SUCTION BUCKET FOUNDATION(S)

(71) Applicant: TIANJIN UNIVERSITY, Tianjin (CN)

(72) Inventors: Yaohua Guo, Tianjin (CN); Ye Yao, Tianjin (CN); Xu Yang, Tianjin (CN); Le Wang, Tianjin (CN); Haijun Wang, Tianjin (CN); Jijian Lian, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/425,884

(22) PCT Filed: May 11, 2021

(86) PCT No.: PCT/CN2021/093050
§ 371 (c)(1),
(2) Date: Jul. 26, 2021

(87) PCT Pub. No.: WO2022/236677
PCT Pub. Date: Nov. 17, 2022

(65) Prior Publication Data
US 2024/0003110 A1    Jan. 4, 2024

(51) Int. Cl.
*E02D 27/52* (2006.01)
*F03D 13/25* (2016.01)
(Continued)

(52) U.S. Cl.
CPC ............ *E02B 17/02* (2013.01); *E02D 27/425* (2013.01); *E02D 27/525* (2013.01); *F03D 13/25* (2016.05);
(Continued)

(58) Field of Classification Search
CPC ................ E02D 27/425; E02D 27/525; E02B 2017/0091; E02B 2017/0078; F03D 13/25; F03D 13/256
(Continued)

(56) References Cited

U.S. PATENT DOCUMENTS 6,786,679 B2 * 9/2004 Huang .................... B63B 17/00
405/209
8,708,605 B2 * 4/2014 Cholley ................ B63B 35/003
405/209

(Continued)

FOREIGN PATENT DOCUMENTS

CN       105793563 A  *  7/2016  ............ B63B 1/107
CN       205396471 U  *  7/2016
(Continued)

*Primary Examiner* — Frederick L Lagman
(74) *Attorney, Agent, or Firm* — Tucker Ellis LLP

(57) ABSTRACT

There provides an auxiliary structure for floating and sinking the whole offshore wind turbine with suction bucket foundation(s), which includes an upper bracket floated on water and a lower bracket sunk synchronously with a support structure. The upper bracket includes upper floating boxes; upper cross-connectors each of which is fixedly connected to the upper hoop and a corresponding upper floating box; and an upper hoop configured to sleeve on an outer side of the support structure. The upper bracket and the support structure are relatively moved in an up and down direction, and are connected in a manner of limiting position. The lower bracket includes lower floating boxes, a bottom of each of which is adjustable in height; lower cross-connectors each of which is fixedly connected to the lower hoop and a corresponding lower floating box; and a lower hoop that holds the support structure tightly.

10 Claims, 9 Drawing Sheets

(51) Int. Cl.
*E02B 17/02* (2006.01)
*E02D 27/42* (2006.01)
*E02B 17/00* (2006.01)

(52) U.S. Cl.
CPC .... *F03D 13/256* (2023.08); *E02B 2017/0039* (2013.01); *E02B 2017/0078* (2013.01); *E02B 2017/0091* (2013.01); *F05B 2240/95* (2013.01)

(58) Field of Classification Search
USPC .................................................. 405/205, 206
See application file for complete search history.

(56) References Cited

U.S. PATENT DOCUMENTS

| | | | |
|---|---|---|---|
| 8,820,259 B2 * | 9/2014 | Lebon | F03D 13/10 114/267 |
| 2011/0155038 A1 * | 6/2011 | Jahnig | B63B 35/44 114/264 |

FOREIGN PATENT DOCUMENTS

| | | | | |
|---|---|---|---|---|
| CN | 108374430 A | * | 8/2018 | |
| CN | 109209774 A | * | 1/2019 | |
| CN | 111021393 A | * | 4/2020 | |
| CN | 111252660 A | * | 6/2020 | |
| CN | 112046699 A | * | 12/2020 | ............. B63B 35/44 |
| FR | 2932771 A1 | * | 12/2009 | ............. B63B 27/04 |
| KR | 102107994 B1 | * | 5/2020 | |

* cited by examiner

AUXILIARY STRUCTURE FOR FLOATING AND SINKING A WHOLE OFFSHORE WIND TURBINE WITH SUCTION BUCKET FOUNDATION(S)

CROSS REFERENCE TO RELATED APPLICATION

This application is a national phase application of International Patent Application No. PCT/CN2021/093050, filed on May 11, 2021, entitled "AUXILIARY STRUCTURE FOR FLOATING AND SINKING A WHOLE OFFSHORE WIND TURBINE WITH SUCTION BUCKET FOUNDATION(S)", which is incorporated herein by reference in its entirety.

TECHNICAL FIELD

The disclosure relates to the technical field of offshore wind power technologies, in particular to an auxiliary structure for floating and sinking a whole offshore wind turbine with suction bucket foundation(s).

BACKGROUND ART

Resources of the wind power are pollution-free green energy. The offshore wind turbine has great application prospects in the development and utilization of new energy due to its advantages of not occupying the arable land and being close to a coastal city group that is a center of consuming power. With a large-scale development and utilization of offshore wind farms, the offshore wind farms have begun to develop towards the deep sea and large-capacity units. In order to ensure the safe, economic and efficient development of wind resources under complex marine environmental conditions, it is necessary to select the most economical and reasonable support structure system for the wind turbine systems and the matching installation technology thereof, in combination with specific sea areas and geological conditions.

Offshore wind turbine systems mostly use single-pile foundations, multi-pile jacket foundations, gravity based foundations, suction bucket foundations, floating foundations, etc. The safety and economic advantages that suction bucket foundations are rapidly installed are achieved with the help of their prefabrication in batches in a factory on land, without the use of the large machinery, which is more and more widely used in offshore wind farms around the world. After the suction bucket foundation with a bottom opening is filled with a certain amount of gas, this suction bucket foundation has a certain self-floating stability, which can basically meet the requirements of stabilizing the basic structure during the long-distance floating transport. And thus this type of suction bucket foundation is widely used in the air-float structure such as an offshore wind turbine, an offshore oil platform, a barrel-type breakwater, etc.

However, only the requirements for the floating transport of the suction bucket foundations themselves may be met in the prior art, and thus the requirements for the long-distance floating transport and the installation of the whole machine, which is composed of the suction bucket foundations, the tower barrel and the wind turbine generator system, cannot be met. Or this whole machine needs to rely on a large-scale special ship to achieve the whole floating transport and installation thereof, so that the operation efficiency is low. At the same time, the overall sinking process needs to overcome the influence of complex marine environment, eccentric load of the turbine system, damage of the soil seepage and other unfavorable factors. Furthermore, it is necessary to enter a site twice to enable the anti-scouring structure to work after the foundations are sunk. Therefore, there is a technical problem to be solved urgently by those skilled in the art that how to provide an auxiliary structure for floating and sinking a whole offshore wind turbine with suction bucket foundation(s) to improve the construction safety and efficiency of the offshore wind turbine.

SUMMARY

The purpose of the present disclosure is to provide an auxiliary structure for floating and sinking a whole offshore wind turbine with suction bucket foundation(s), which realizes the long-distance floating transport and the deep sea installation of the whole offshore wind turbine with the suction bucket foundation(s), and improves the construction safety and the efficiency of offshore wind turbine.

In order to achieve the above objectives, the present disclosure provides the following solutions.

An auxiliary structure for floating and sinking a whole offshore wind turbine with at least one suction bucket foundation, the auxiliary structure being configured to be mounted on the offshore wind turbine, the offshore wind turbine including a support structure and a wind turbine generator system mounted on the support structure, the support structure including a tower barrel and the at least one suction bucket foundation mounted on a lower portion of the tower barrel, wherein the auxiliary structure includes: an upper bracket floated on water, wherein the upper bracket includes upper floating boxes, upper cross-connectors and an upper hoop, each of the upper cross-connectors is fixedly connected to the upper hoop and a corresponding one of the upper floating boxes, the upper hoop is configured to sleeve on an outer side of the support structure, the upper bracket and the support structure are movable relative to each other in an up and down direction, and the upper bracket and the support structure are connected in a manner of limiting position, so as to enable the upper bracket to right the support structure when the support structure is sunk; and a lower bracket sunk synchronously with the support structure, wherein the lower bracket includes lower floating boxes, lower cross-connectors and a lower hoop, each of the lower cross-connectors is fixedly connected to the lower hoop and a corresponding one of the lower floating boxes, the lower hoop is capable of holding the support structure tightly, and a bottom of each of the lower floating boxes is adjustable in height.

Preferably, the bottom of each of the lower floating boxes is provided with a first through-hole, and a second through-hole is provided on a top or walls of each of the lower floating boxes.

Preferably, a third through-hole is provided on each of the upper floating boxes.

Preferably, the upper hoop and/or the lower hoop is capable of being opened and closed.

Preferably, the upper floating boxes include at least three upper floating boxes, the lower floating boxes include at least three lower floating boxes, and the at least three upper floating boxes and the at least three lower floating boxes are all evenly arranged along a circumferential direction of the support structure.

Preferably, a number of the upper floating boxes is same as that of the lower floating boxes, and each of the upper floating boxes is directly opposite to or staggered with a corresponding one of the lower floating boxes in a vertical direction.

Preferably, the at least one suction bucket foundation, an upper end of the one suction bucket foundation is fixedly connected to a lower end of the tower barrel; the upper hoop is sleeved on an outer side of the tower barrel, an inner surface of the upper hoop is in contact with the tower barrel to limit an angle of the tower barrel; and the lower hoop is capable of holding the tower barrel tightly.

Preferably, the support structure includes the tower barrel, a jacket and a plurality of suction bucket foundations of the at least one suction bucket foundation, an upper end of the jacket is fixedly connected to the tower barrel, a lower end of the jacket is fixedly connected to each of the suction bucket foundations; the upper hoop is sleeved on an outer side of the jacket, the upper bracket and the suction bucket foundations are connected via a plurality of lifting slings, lower ends of the plurality of lifting slings are fixed on the suction bucket foundations, upper ends of the plurality of lifting slings are fixed on a device for retracting the lifting slings, the device for retracting the lifting slings is fixed on the upper bracket; and the lower hoop is capable of holding the jacket tightly.

Preferably, the support structure includes the tower barrel, a jacket and a plurality of suction bucket foundations of the at least one suction bucket foundation, an upper end of the jacket is fixedly connected to the tower barrel, a lower end of the jacket is fixedly connected to each of the suction bucket foundations; the upper hoop is sleeved on an outer side of the jacket, the upper cross-connectors are portal-type cross-connectors, an inner surface of the upper hoop is in contact with the tower barrel to limit an angle of the tower barrel; and the lower hoop is capable of holding the tower barrel tightly.

Preferably, an anti-scouring sand shell film, the anti-scouring sand shell film is sleeved on an outer side of the support structure, and provided beneath the lower cross-connectors.

Compared with the prior art, the embodiments have achieved the following technical effects.

The lower bracket in the embodiments can improve the stability of the whole machine during the floating transport and the sinking, thereby realizing the long-distance floating transport and the on-site overall installation of the whole machine. At the same time, the bottom of the lower floating box is adjustable in height, and the bottom of the box is moved downward during the floating transport, which can provide the more buoyancy. And during the suction bucket foundation is sunk and entered into soil, the bottom moves upward to form the suction bucket structure, thereby providing the more auxiliary downward pressure for the suction bucket foundation, which avoids a problem that is a penetration failure due to the suction bucket foundation enters soil too shallow; or avoids another problem that the suction bucket foundation is not sunk in place due to a final pressure difference is not enough. Therefore, the embodiments improve the buoyancy and the construction efficiency of the offshore wind turbine, realize long-distance floating transport of the whole machine and the on-site rapid installation, improve the construction efficiency and the safety, and greatly reduce the construction cost.

Moreover, other solutions of the embodiments make the anti-scouring sand shell-film to be located beneath the lower cross-connectors, which can synchronously sink the anti-scouring sand shell-film and the lower bracket to avoid secondary construction of the anti-scouring structure, and can prevent the anti-scouring sand shell-film from being towed up when retrieving the lower bracket. So, the construction efficiency is improved.

Figure 1:
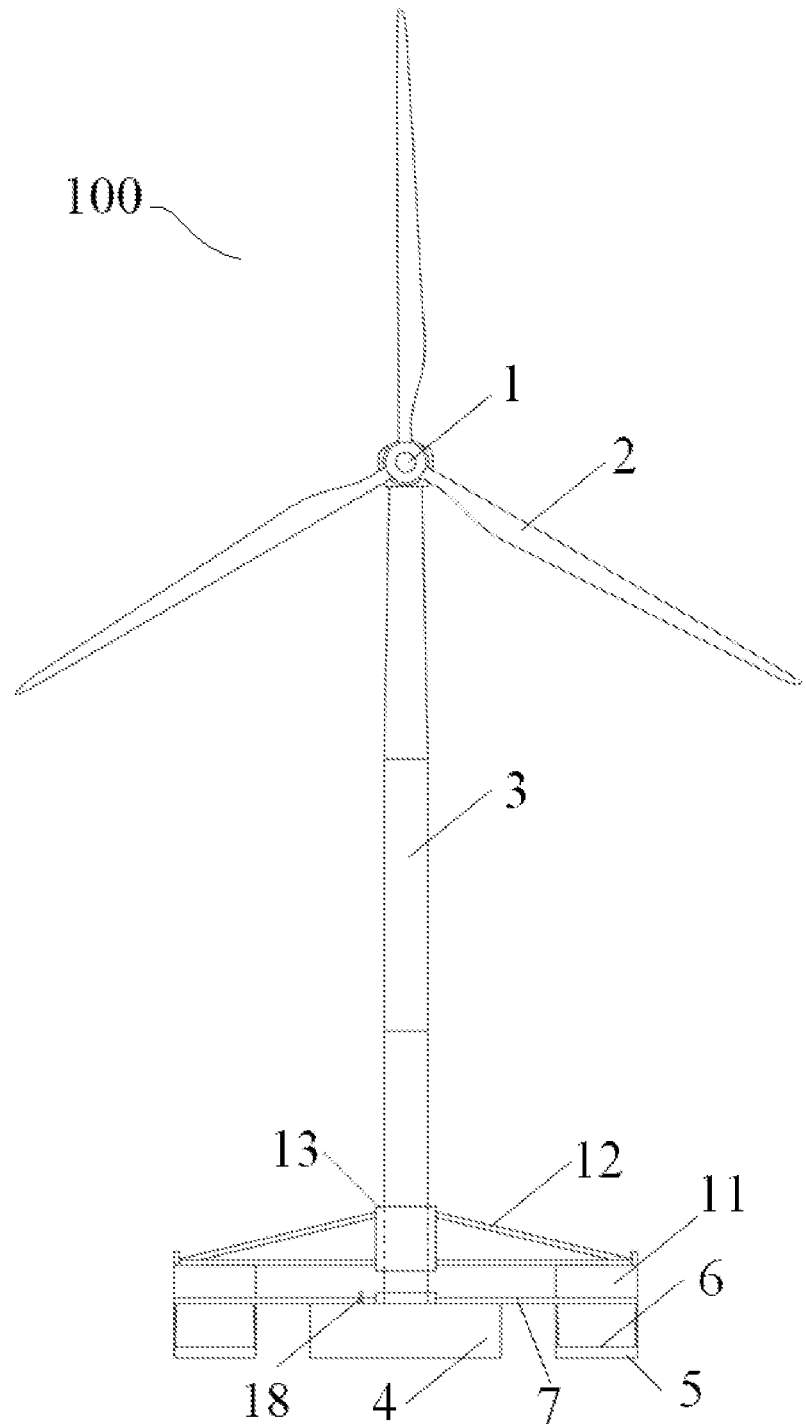
FIG. 1 is a schematic diagram showing a structure of an auxiliary structure for floating and sinking a whole offshore wind turbine with suction bucket foundation(s) according to an embodiment of the disclosure.
Figure 2:
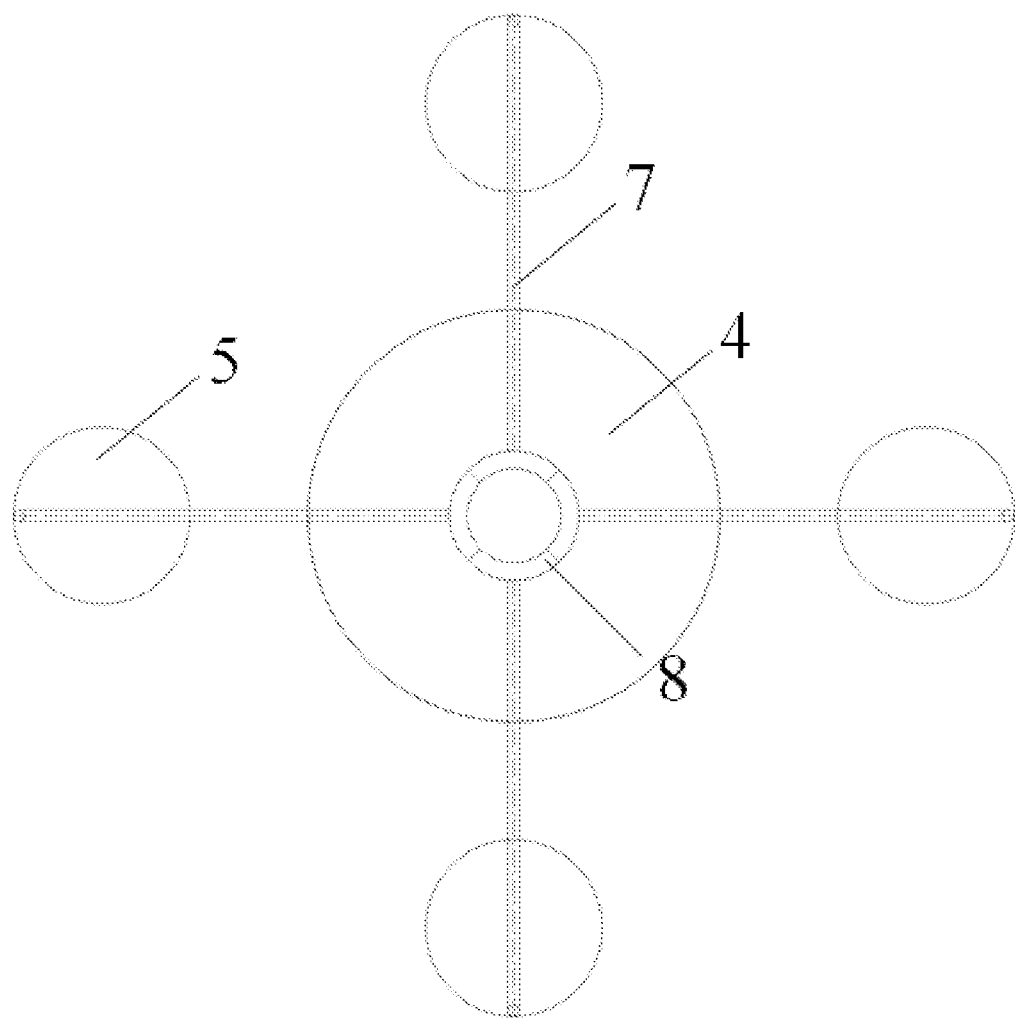
FIG. 2 is a top schematic diagram of a partial structure in FIG. 1.
Figure 3:
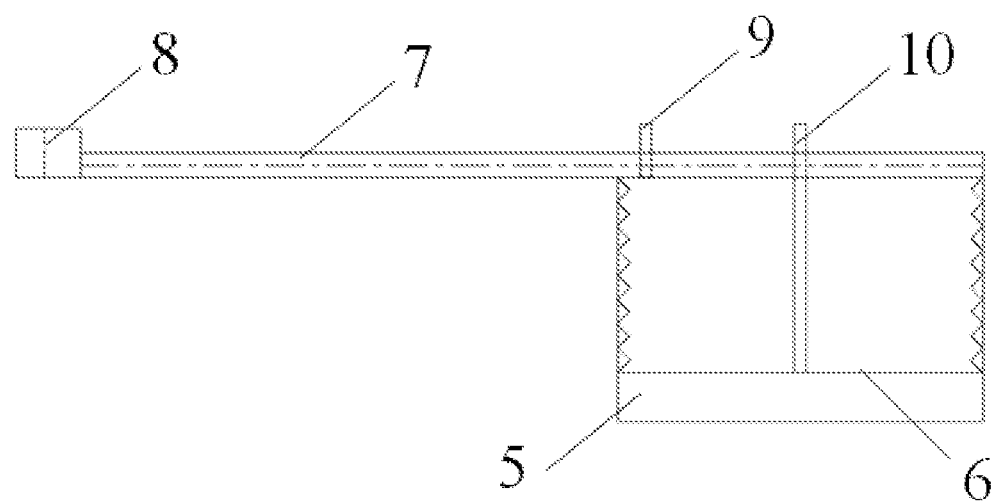
FIG. 3 is a schematic diagram showing a structure of a single lower floating box.
Figure 4:
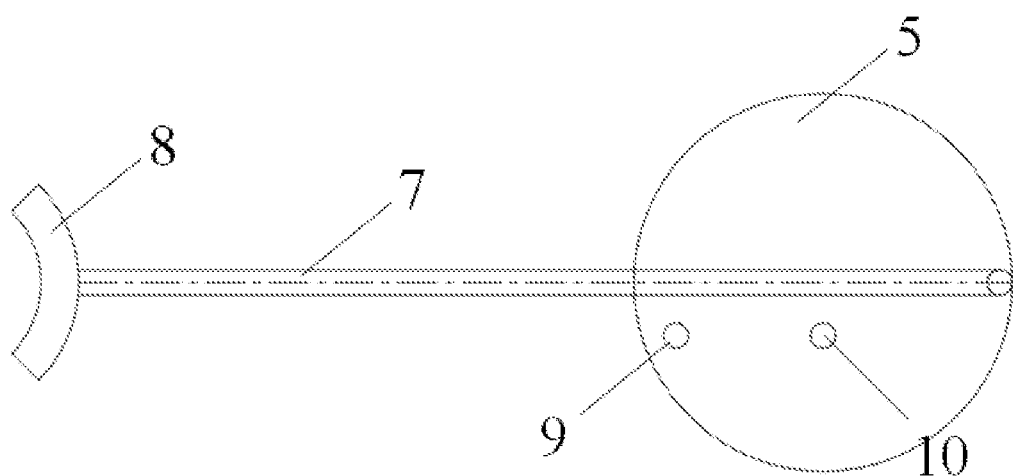
FIG. 4 is a top view of the single lower floating box.
Figure 5:
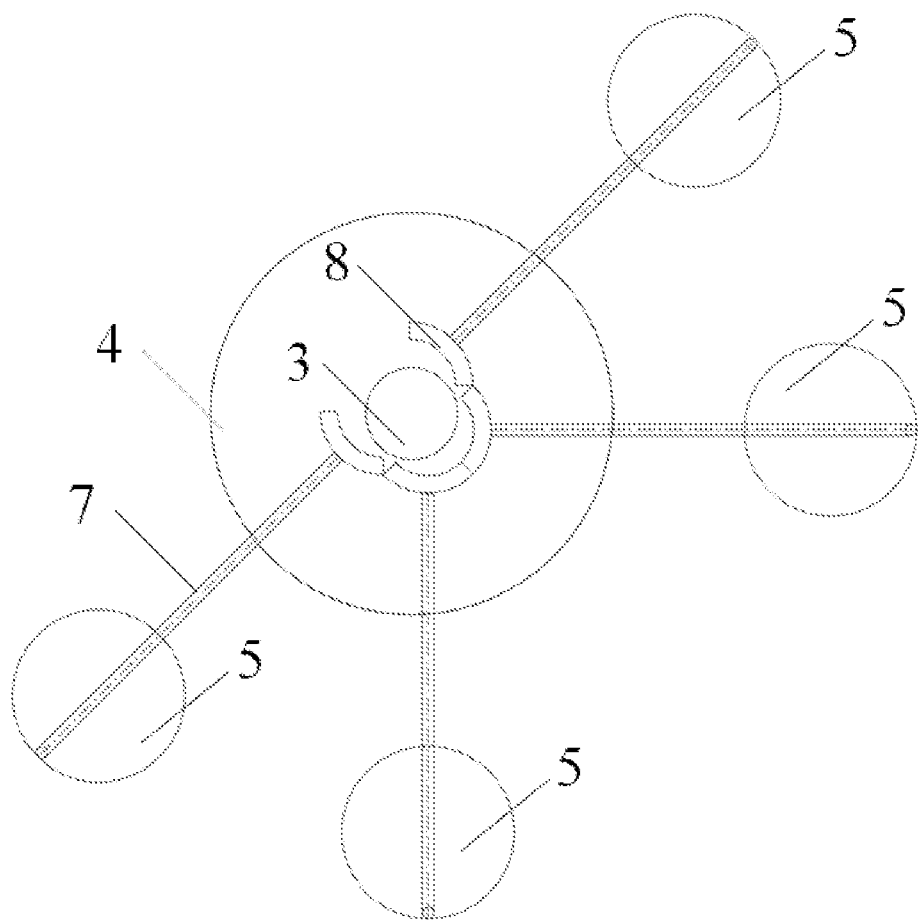
FIG. 5 is a schematic diagram of a lower bracket after a lower hoop is separated from a tower barrel.
Figure 6:
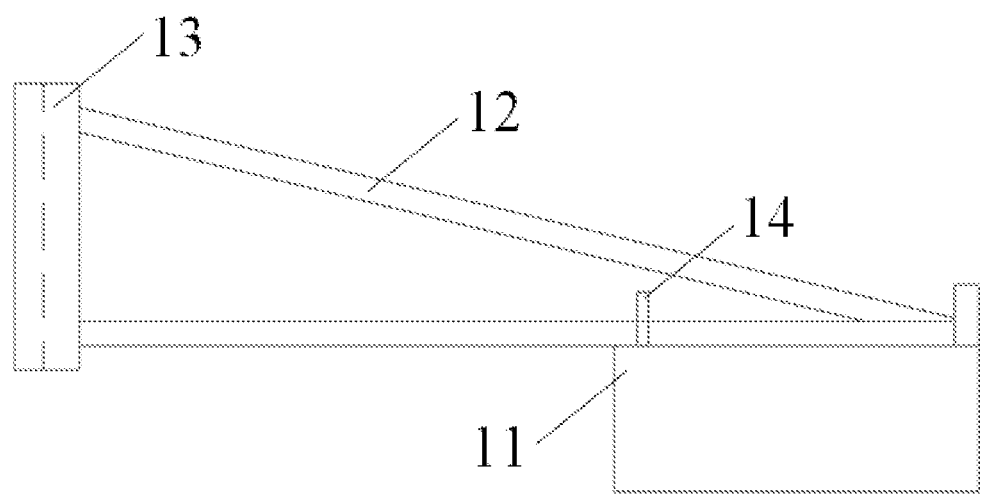
FIG. 6 is a schematic diagram showing a structure of a single upper floating box.
Figure 7:
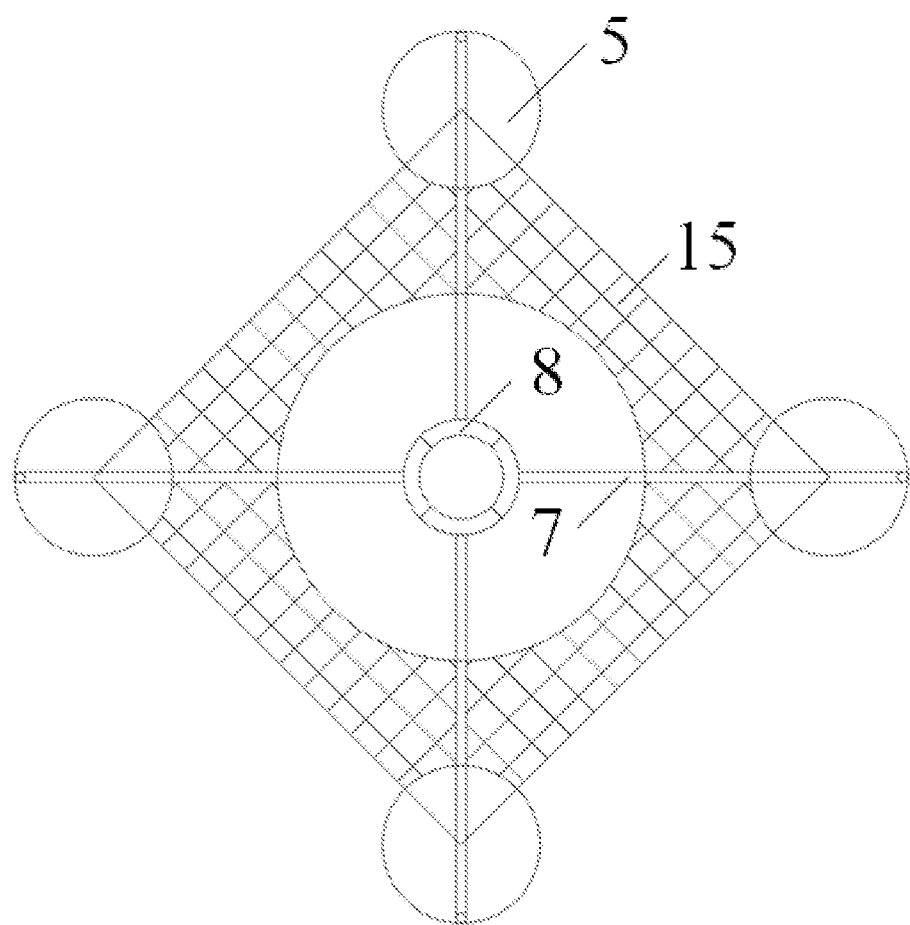
FIG. 7 is a schematic diagram showing an installation position of an anti-scouring sand shell-film.
Figure 8:
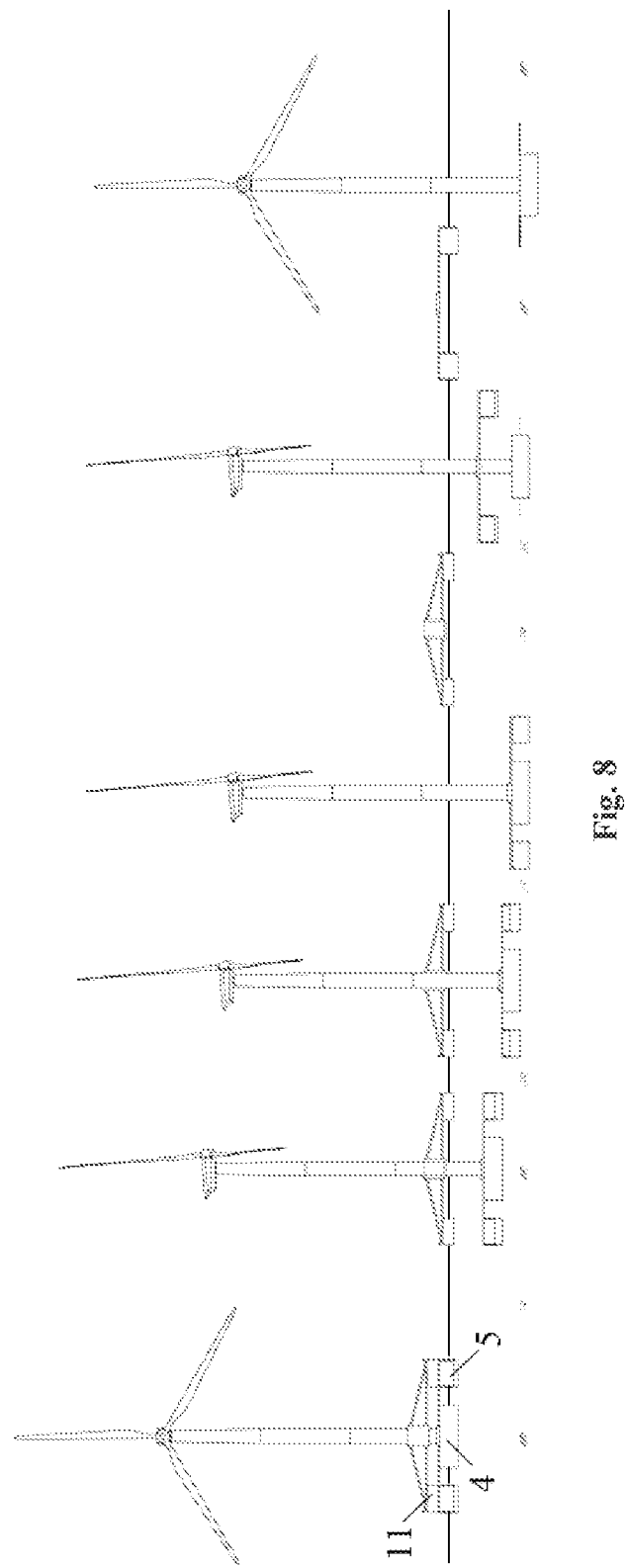
FIG. 8 is a construction flow chart of the auxiliary structure for floating and sinking the whole offshore wind turbine with suction bucket foundation(s) in FIG. 1.

REFERENCE SIGNS 100 auxiliary structure for floating and sinking a whole offshore wind turbine with suction bucket foundation(s); 1 generator body; 2 fan blade; 3 tower barrel; 4 suction bucket foundation; 5 lower floating box; 6 bottom. 7 lower cross-connector; 8 lower hoop; 9 second through-hole; 10 first through-hole; 11 upper floating box; 12 upper cross-connector; 13 upper hoop; 14 third through-hole; 15 anti-scouring sand shell-film; 16 jacket, 17 lifting sling; 18 top access-hole.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present invention, all other embodiments obtained by those of ordinary skill in the art without creative work shall fall within the protection scope of the present invention.

The purpose of the present disclosure is to provide an auxiliary structure for floating and sinking a whole offshore wind turbine with suction bucket foundation(s), which realizes the long-distance floating transport and the deep sea installation of the whole offshore wind turbine with the suction bucket foundation(s), and improves the construction safety and the efficiency of the offshore wind turbine.

In order to make the above objectives, features and advantages of the present disclosure more obvious and understandable, the present disclosure will be further described in detail below with reference to the accompanying drawings and specific embodiments.

As shown in FIGS. 1-11, this embodiment provides an auxiliary structure 100 for floating and sinking a whole offshore wind turbine with suction bucket foundation(s), which is configured for installing on the offshore wind turbine. The offshore wind turbine includes a support structure and a wind turbine generator system mounted on the support structure. The wind turbine generator system includes a generator body 1 and fan blades 2. The support structure includes a tower barrel 3 and the suction bucket foundation(s) 4 mounted on a lower portion of the tower barrel 3.

The auxiliary structure 100 for floating and sinking a whole offshore wind turbine with suction bucket foundation(s) in the embodiments includes an upper bracket floated on water and a lower bracket sank synchronously with the support structure. The upper bracket includes upper floating boxes 11, upper cross-connectors 12 and an upper hoop 13. And the upper cross-connector 12 is fixedly connected to the upper floating box 11 and the upper hoop 13. The upper hoop 13 is configured to sleeve on an outer side of the support structure, and the upper bracket and the support structure can move relative to each other in an up and down direction. The upper bracket is connected with the support structure in a manner of limiting position, so that the upper bracket can right the support structure when the support structure is sunk. The lower bracket includes lower floating boxes 5, lower cross-connectors 7 and lower hoops 8. The lower cross-connector 7 is fixedly connected to the lower floating box 5 and the lower hoop 8. The lower hoop 8 can hold the support structure tightly, and the bottom 6 of the lower floating box 5 can be adjusted in height. During the adjustment process, the bottom 6 and inner walls of the lower floating box 5 are in a piston-type sealing contact.

When the auxiliary structure 100 for floating and sinking a whole offshore wind turbine with suction bucket foundation(s) of this embodiment is used, after being assembled on the shore, the auxiliary structure is first transported to a designated location by the floating transport on the sea, and then is sunk. During the floating transport, the lower hoop 8 holds the support structure tightly, and the bottom 6 of the lower floating box 5 is located at a bottom of the lower floating 5, so the lower floating box 5 has a larger volume and can provide greater buoyancy for the support structure, thereby making up the lack of buoyancy of the suction bucket foundation 4 itself, which facilitates the floating transport of the whole machine. After the whole machine is in place by the float transport, the air in the suction bucket foundations 4 is gradually discharged from the respective top access-holes 18 through a pump, and the bottoms 6 of the lower floating boxes 5 are moved upward so as to gradually discharge the air in the lower floating boxes 5. In this way, the lower bracket and the supporting structure are synchronously sunk under the action of gravity. During the sinking process, the upper bracket always floats on the sea plane, and the upper bracket is basically horizontal. And the upper bracket has the self-stability under the action of buoyancy. Therefore, through a certain limit structure, the upper bracket and the supporting structure are connected with each other in a manner of limiting position, so that the upper bracket can right the support structure when the support structure is sunk. After bucket skirts of the suction bucket foundations 4 and bucket skirts of the lower floating boxes 5 are in contact with seabed soil, they enter the seabed soil to a certain depth under the action of their own gravities, and both the upper support and the lower support can play a role of righting. After that, the pump gradually discharges the seawater in the suction bucket foundations 4, so that negative pressure is formed in the suction bucket foundations 4, and the seawater presses the suction bucket foundations 4 into the soil. In the same way, the seawater under the bottoms 6 can also be gradually discharged through the pump, so as to provide the more auxiliary downward pressure for the suction bucket foundations 4. After sinking the suction bucket foundations 4 into the soil, in order to realize the recycling of the upper bracket and the lower bracket, the upper bracket and the support structure can be separated, and the lower hoop 8 can be separated from the support structure. And the bottoms 6 of the lower floating boxes 5 are moved and pressed downward to the seabed such as by injecting water into the floating boxes 5, and the lower floating boxes 5 are separated from the seabed under the action of the reaction force. Furthermore, the lower floating boxes 5 are floated upward by injecting air into the lower floating boxes 5, and the upper bracket and the lower bracket are dragged to a designated position by a tug boat.

In this embodiment, the bottom 6 of the lower floating box 5 is provided with a first through-hole 10, and a second through-hole 9 is provided on top or inner walls of the lower floating box 5. Gas can be introduced into the lower floating boxes 5 through the respective first through-holes 10 to facilitate the subsequent floating transport; or the gas in the lower floating boxes 5 can be extracted through the respective first through-holes 10 to facilitate the sinking operation. When the liquid is injected into the lower floating boxes 5 through the respective first through-holes 10, the bottoms 6 can be moved down, and the lower floating boxes 5 are separated from the seabed under the action of the reaction force. Similarly, when the gas or the liquid is introduced beneath the bottoms 6 through the respective second through-holes 9, the lower floating boxes 5 can also be separated from the seabed. The lower floating box 5 is preferably provided with a limit structure to limit the bottom 6 to move downward to an extreme position, and to prevent the bottom 6 from being separated from the lower floating box 5.

In this embodiment, the upper floating box 11 is provided with a third through-hole 14. Through the third through-hole 14, gas can be introduced into and extracted from the upper floating box 11, and liquid can be injected into and extracted from the upper floating box 11, so as to adjust the gravity of the upper floating box 11 based on the actual situations.

In order to facilitate the installation and disassembly of the upper hoop 13 and the lower hoop 8, as for the opening and the closing of the upper hoop 13 and/or the lower hoop 8 in this embodiment, the opening and closing of each part of the upper hoop and the opening and the closing of each part of the lower hoop are realized, including but not limited to by the components including a bolt and a nut.

In order to improve the overall stability, in this embodiment, the number of the upper floating boxes 11 is at least three, and the number of the lower floating boxes 5 is at least three. And the at least three upper floating boxes and the at least three lower floating boxes are evenly arranged along a circumferential direction of the supporting structure. The number of the upper floating box 11 and the lower floating boxes 5 preferably is the same. The upper floating box 11 and the lower floating box 5 are preferably arranged directly opposite to or staggered with each other in a vertical position.

It should be noted that there are many types of support structures. When different support structures are selected, the mode that these support structures are connected with the upper bracket and the lower bracket respectively should be selected based on the actual situations.

For example, the support structure includes a tower barrel 3 and a suction bucket foundation 4. When an upper end of the suction bucket foundation 4 is fixedly connected to a lower end of the tower barrel 3, the upper hoop 13 can be sleeved on an outer side of the tower barrel 3. The inner surface of the upper hoop 13 can be in contact with the tower barrel 3 to limit an angle of the tower barrel 3, and the lower hoop 8 can hold the tower 3 tightly (as shown in FIGS. 1-8).

When the upper hoop 13 holds the tower barrel 3 tightly, the upper bracket can support the tower barrel 3, which can improve the stability in the floating transport. When the upper hoop 13 and the tower barrel 3 are loosened to a certain gap, the upper hoop 13 and the tower barrel 3 can move relative to each other in the up and down direction, and the tower barrel 3 can be righted during the sinking. When the lower hoop 8 holds the tower barrel 3 tightly, the floating transport and the sinking can be performed. When the upper hoop 13 and the lower hoop 8 are separated from the tower barrel 3, the upper bracket and the lower bracket can be retrieved.

Figure 9:
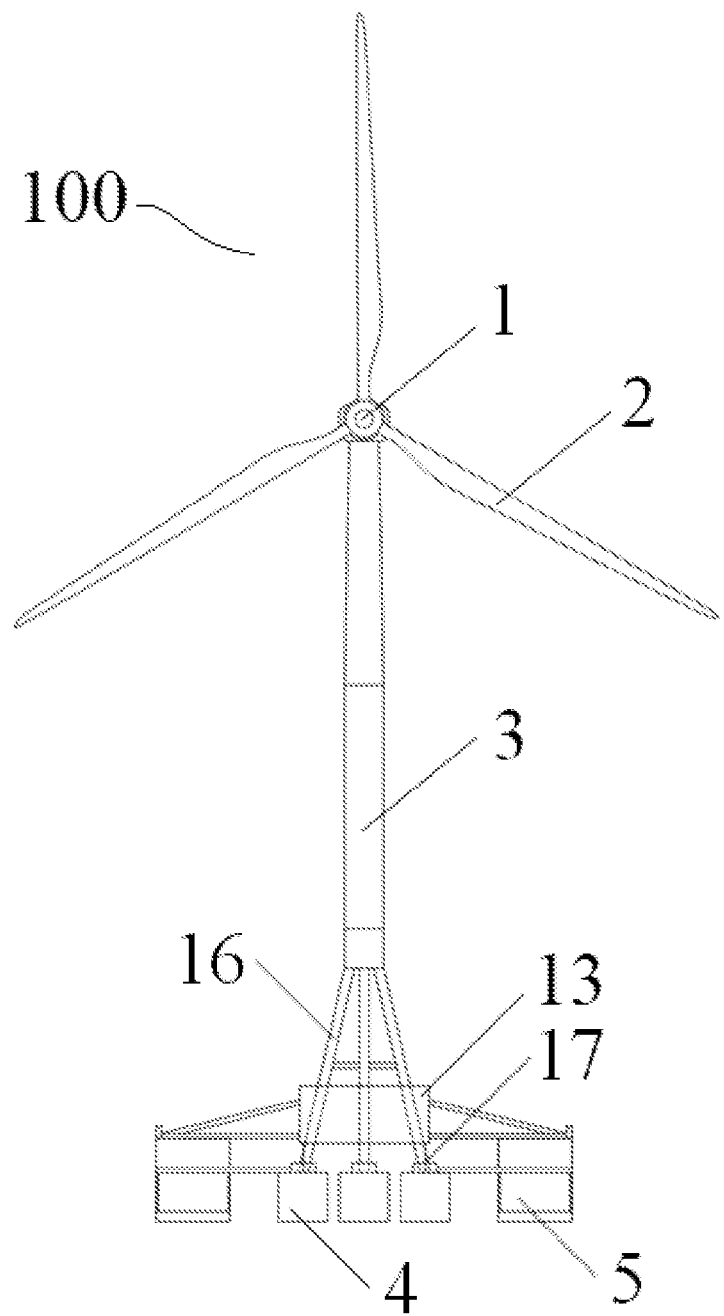
FIG. 9 is another schematic diagram showing a structure of an auxiliary structure for floating and sinking a whole offshore wind turbine with suction bucket foundation(s) according to an embodiment of the disclosure.
Figure 10:
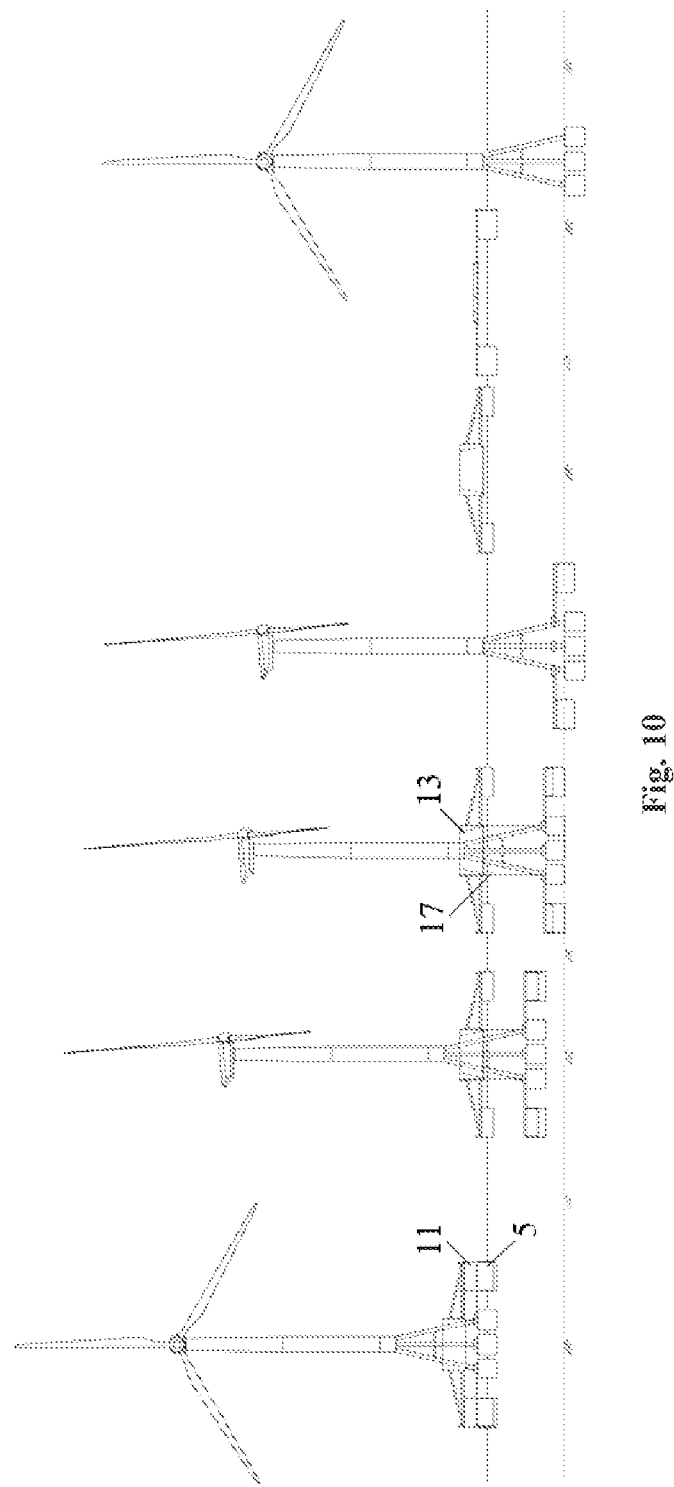
FIG. 10 is a construction flow chart of the auxiliary structure for floating and sinking the whole offshore wind turbine with suction bucket foundation(s) in FIG. 9.

For another example, with the support structure including a tower barrel 3, a jacket 16 and multiple suction bucket foundations 4, when an upper end of the jacket 16 is fixedly connected to the tower barrel 3, and a lower end of the jacket 16 is simultaneously fixedly connected with the multiple suction bucket foundations 4, the upper hoop 13 can be sleeved on an outer side of the jacket 16. The upper bracket and the suction bucket foundations 4 are connected by a plurality of lifting slings 17. Lower ends of the lifting slings 17 are fixed on the suction bucket foundations 4. Upper ends of the lifting slings are fixed on a device for retracting the lifting slings 17. The device for retracting the lifting slings 17 is fixed on the upper bracket, and the lower hoop 8 can hold the jacket 16 tightly (as shown in FIGS. 9-10).

During the floating transport, the upper bracket supports the support structure via the lifting slings 17. During the sinking operation, the device for retracting the lifting slings 17 releases the lifting slings 17, and the support structure is gradually sunk. Since there are multiple lifting slings 17, when the support structure is inclined, a side thereof which is downwardly inclined is subjected to a pulling force of the lifting slings 17, so that the lifting slings play a role of righting. When retrieving the upper bracket, the upper hoop 13 may be separated from the jacket 16 and the lifting slings 17 may be separated from the suction bucket foundations 4. When the lower bracket is retrieved, the lower hoop 8 may be separated from the jacket 16.

Figure 11:
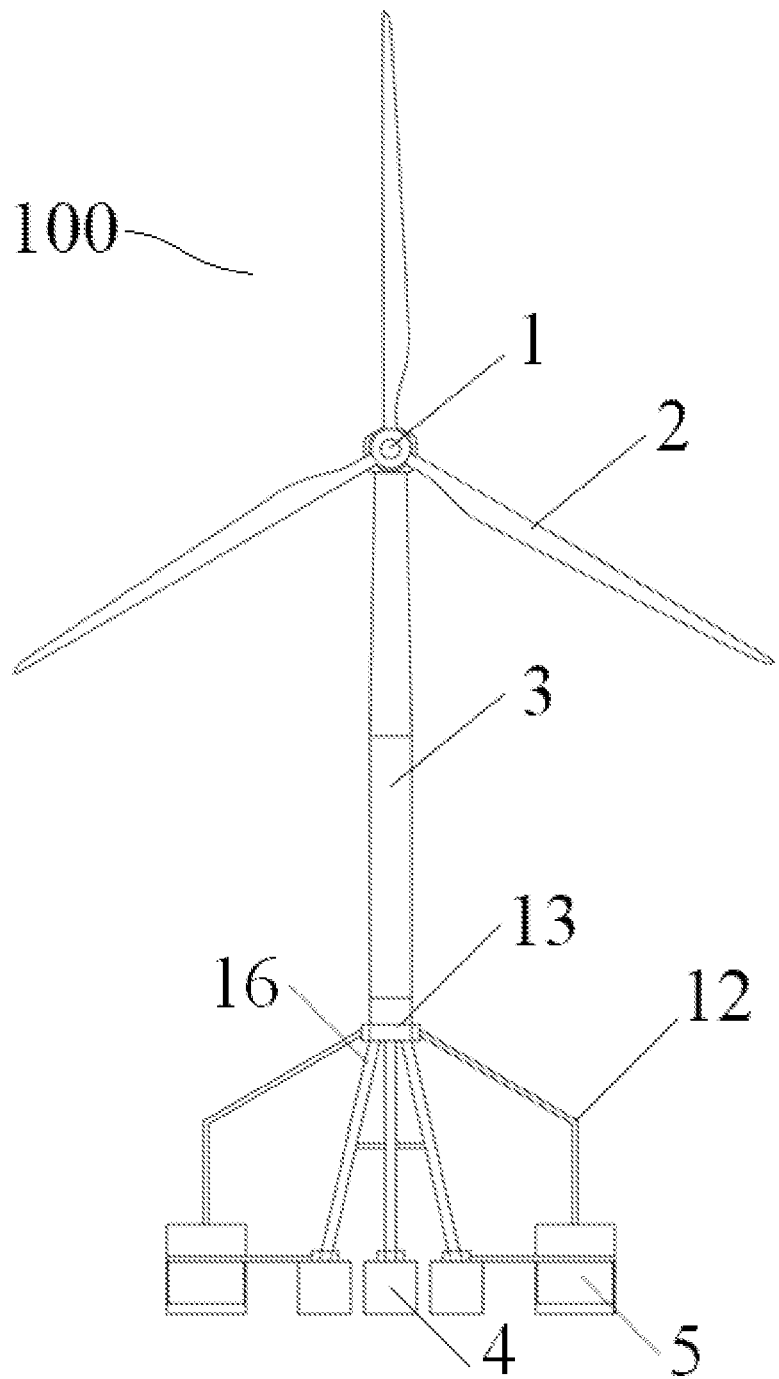
FIG. 11 is yet another schematic diagram showing a structure of an auxiliary structure for floating and sinking a whole offshore wind turbine with suction bucket foundation(s) according to an embodiment of the disclosure.

For yet another example, with the support structure including a tower barrel 3, a jacket 16 and multiple suction bucket foundations 4, when the upper end of the jacket 16 is fixedly connected to the tower barrel 3, and the lower end of the jacket 16 is simultaneously fixed connected with the multiple suction bucket foundations 4, the upper hoop 13 can also be sleeved on the outer side of the tower barrel 3. The upper cross-connectors 12 are portal type cross-connectors. The inner surface of the upper hoop 13 is configured to be in contact with the tower barrel 3 to limit the position, and the lower hoop 8 may hold the tower barrel 3 tightly (as shown in FIG. 11).

When the upper hoop 13 holds the tower barrel 3 tightly, the upper bracket can support the tower barrel 3, which can improve the stability in the floating transport. When the upper hoop 13 and the tower barrel 3 are loosened to a certain gap, the upper hoop 13 and the tower barrel 3 can move relative to each other in the up and down direction, and the tower barrel 3 can be righted during the sinking operation. When the lower hoop 8 holds the jacket 16 tightly, floating and sinking operations can be performed. When the upper hoop 13 is separated from the tower 3, and the lower hoop 8 is separated from the jacket 16, the upper bracket and the lower bracket can be retrieved.

In order to further improve the efficiency of the construction and to avoid entering the site twice to carry out the operation of the anti-scouring structure, this embodiment also includes an anti-scouring sand shell-film 15, which is sleeved on the outer side of the support structure and located beneath the lower cross-connectors 7. An interlayer of the anti-scouring sand shell-film 15 is not filled with sea sand at an initial stage. After the suction bucket foundations 4 is sunk and entered into soil, the interlayer of the anti-scouring sand shell-film 15 is filled with the sea sand, so as to form an anti-scouring sand shell-layer with a certain rigidity and thickness around the suction bucket foundations 4.

In this description, specific examples are configured to describe the principle and implementation of the present disclosure. The description of the above examples is only used to help understand the method and the core idea of the present disclosure. At the same time, for those of ordinary skill in the art, according to the idea of the disclosure, there exists the modification in the specific implementation and the scope of application. In summary, the content of this description should not be construed as a limitation to the present disclosure.

What is claimed is:

1. An auxiliary structure for floating and sinking a whole offshore wind turbine with at least one suction bucket foundation, the auxiliary structure being configured to be mounted on the offshore wind turbine, the offshore wind turbine comprising a support structure and a wind turbine generator system mounted on the support structure, the support structure comprising a tower barrel and the at least one suction bucket foundation mounted on a lower portion of the tower barrel, wherein the auxiliary structure comprises:

an upper bracket floated on water, wherein the upper bracket comprises upper floating boxes, upper cross-connectors and an upper hoop, each of the upper cross-connectors is fixedly connected to the upper hoop and a corresponding one of the upper floating boxes, the upper hoop is configured to sleeve on an outer side of the support structure, the upper bracket and the support structure are movable relative to each other in an up and down direction, and the upper bracket and the support structure are connected in a manner of limiting position, so as to enable the upper bracket to right the support structure when the support structure is sunk; and a lower bracket sunk synchronously with the support structure, wherein the lower bracket comprises lower floating boxes, lower cross-connectors and a lower hoop, each of the lower cross-connectors is fixedly connected to the lower hoop and a corresponding one of the lower floating boxes, the lower hoop is capable of holding the support structure tightly, and a bottom of each of the lower floating boxes is adjustable in height.

2. The auxiliary structure for floating and sinking the whole offshore wind turbine with at least one suction bucket foundation according to claim 1, wherein,
the bottom of each of the lower floating boxes is provided with a first through-hole, and a second through-hole is provided on a top or walls of each of the lower floating boxes.

3. The auxiliary structure for floating and sinking the whole offshore wind turbine with at least one suction bucket foundation according to claim 1, wherein,
a third through-hole is provided on each of the upper floating boxes.

4. The auxiliary structure for floating and sinking a whole offshore wind turbine with at least one suction bucket foundation according to claim 1, wherein,
the upper hoop and/or the lower hoop is capable of being opened and closed.

5. The auxiliary structure for floating and sinking the whole offshore wind turbine with at least one suction bucket foundation according to claim 1, wherein,
the upper floating boxes comprise at least three upper floating boxes, the lower floating boxes comprise at least three lower floating boxes, and the at least three upper floating boxes and the at least three lower floating boxes are all evenly arranged along a circumferential direction of the support structure.

6. The auxiliary structure for floating and sinking the whole offshore wind turbine with at least one suction bucket foundation according to claim 1, wherein,
a number of the upper floating boxes is same as that of the lower floating boxes, and each of the upper floating boxes is directly opposite to or staggered with a corresponding one of the lower floating boxes in a vertical direction.

7. The auxiliary structure for floating and sinking the whole offshore wind turbine with at least one suction bucket foundation according to claim 1, wherein,
the support structure comprises the tower barrel and one suction bucket foundation of the at least one suction bucket foundation, an upper end of the one suction bucket foundation is fixedly connected to a lower end of the tower barrel;
the upper hoop is sleeved on an outer side of the tower barrel, an inner surface of the upper hoop is in contact with the tower barrel to limit an angle of the tower barrel; and
the lower hoop is capable of holding the tower barrel tightly.

8. The auxiliary structure for floating and sinking the whole offshore wind turbine with at least one suction bucket foundation according to claim 1, wherein,
the support structure comprises the tower barrel, a jacket and a plurality of suction bucket foundations of the at least one suction bucket foundation, an upper end of the jacket is fixedly connected to the tower barrel, a lower end of the jacket is fixedly connected to each of the suction bucket foundations;
the upper hoop is sleeved on an outer side of the jacket, the upper bracket and the suction bucket foundations are connected via a plurality of lifting slings, lower ends of the plurality of lifting slings are fixed on the suction bucket foundations, upper ends of the plurality of lifting slings are fixed on a device for retracting the lifting slings, the device for retracting the lifting slings is fixed on the upper bracket; and
the lower hoop is capable of holding the jacket tightly.

9. The auxiliary structure for floating and sinking a whole offshore wind turbine with at least one suction bucket foundation according to claim 1, wherein,
the support structure comprises the tower barrel, a jacket and a plurality of suction bucket foundations of the at least one suction bucket foundation, an upper end of the jacket is fixedly connected to the tower barrel, a lower end of the jacket is fixedly connected to each of the suction bucket foundations;
the upper hoop is sleeved on an outer side of the jacket, the upper cross-connectors are portal-type cross-connectors, an inner surface of the upper hoop is in contact with the tower barrel to limit an angle of the tower barrel; and
the lower hoop is capable of holding the tower barrel tightly.

10. The auxiliary structure for floating and sinking the whole offshore wind turbine with at least one suction bucket foundation according to claim 1, further comprising an anti-scouring sand shell film, the anti-scouring sand shell film is sleeved on an outer side of the support structure, and provided beneath the lower cross-connectors.

* * * * *